(12) United States Patent
Otaki et al.

(10) Patent No.: US 10,337,905 B2
(45) Date of Patent: Jul. 2, 2019

(54) CALIBRATION DEVICE AND CALIBRATION METHOD

(71) Applicant: Tatsuno Corporation, Tokyo (JP)

(72) Inventors: Tsutomu Otaki, Tokyo (JP); Norikazu Osawa, Tokyo (JP)

(73) Assignee: TATSUNO CORPORATION, Tokyo (JP)

(*) Notice: Subject to any disclaimer, the term of this patent is extended or adjusted under 35 U.S.C. 154(b) by 30 days.

(21) Appl. No.: 15/273,328

(22) Filed: Sep. 22, 2016

(65) Prior Publication Data

US 2017/0089754 A1 Mar. 30, 2017

(30) Foreign Application Priority Data

Sep. 28, 2015 (JP) .................................. 2015-189397

(51) Int. Cl.
*F17C 5/06* (2006.01)
*F17C 13/02* (2006.01)
(Continued)

(52) U.S. Cl.
CPC ...... *G01F 25/0046* (2013.01); *G01F 25/0053* (2013.01); *G01F 25/0084* (2013.01); *G01G 17/04* (2013.01); *F17C 5/06* (2013.01); *F17C 13/023* (2013.01); *F17C 13/028* (2013.01); *F17C 2250/0421* (2013.01);
(Continued)

(58) Field of Classification Search
CPC ........ G01G 17/04; G01G 17/06; G01G 23/01; G01G 23/48; G01F 25/0046; G01F 23/20; F17C 5/06; F17C 2250/0421; F17C 13/023; F17C 13/028
See application file for complete search history.

(56) References Cited

U.S. PATENT DOCUMENTS 4,216,886 A * 8/1980 Puschalovsky ........ B22D 39/00
164/155.7
4,838,096 A 6/1989 Lowe
(Continued)

FOREIGN PATENT DOCUMENTS

CN 102141193 8/2011
EP 1774280 4/2007
(Continued)

OTHER PUBLICATIONS

European Patent Office, European Search Report, dated May 10, 2017, 10 pages, Munich, Germany.

*Primary Examiner* — Herbert K Roberts
(74) *Attorney, Agent, or Firm* — Stetina Brunda Garred and Brucker; Mark B. Garred

(57) ABSTRACT

To provide a calibration device for apparatus filling a gas such as hydrogen gas and capable of precisely measuring quantity of the gas that is filled at high pressure. A calibration device of the present invention includes: a filling vessel 2, accommodated in a measurement housing 1, to the filling vessel 2 a high pressure fuel gas such as hydrogen gas being fed from outside of the measurement housing 1; a scale 3 for measuring a weight of a fuel gas fed to the filling vessel 2; and a control device CU for eliminating an error caused by changing buoyant force from a gas in the measurement housing before and after filling the fuel gas.

13 Claims, 5 Drawing Sheets

(51) Int. Cl.
  *G01G 23/01* (2006.01)
  *G01G 17/04* (2006.01)
  *G01G 17/06* (2006.01)
  *G01F 25/00* (2006.01)
  *G01G 23/48* (2006.01)
  *G01F 23/20* (2006.01)

(52) U.S. Cl.
  CPC ............ *G01F 23/20* (2013.01); *G01G 17/06* (2013.01); *G01G 23/01* (2013.01); *G01G 23/48* (2013.01)

(56) References Cited

U.S. PATENT DOCUMENTS

| | | |
|---|---|---|
| 5,052,405 A | 10/1991 | Batchelder |
| 5,301,723 A | 4/1994 | Goode |
| 5,335,552 A * | 8/1994 | Hylton ............... G01F 1/76 73/861 |
| 5,913,344 A * | 6/1999 | Wronski ............ F17C 5/005 141/4 |
| 6,615,638 B1 * | 9/2003 | Lochner ............. B01L 3/021 177/1 |
| 6,718,832 B1 | 4/2004 | Hay |
| 2003/0070724 A1 * | 4/2003 | Shock ................ B65B 31/00 141/83 |
| 2008/0209916 A1 | 9/2008 | White |
| 2010/0206098 A1 * | 8/2010 | Wilby ................ G01G 9/00 73/865 |
| 2014/0144714 A1 * | 5/2014 | Kjar .................. G01G 17/00 177/1 |
| 2015/0247753 A1 * | 9/2015 | Braissant ........... B41J 2/17566 222/1 |
| 2016/0252388 A1 * | 9/2016 | Esser ................ G01G 17/04 177/1 |
| 2018/0180224 A1 * | 6/2018 | Pringle ............. G01M 3/3236 |

FOREIGN PATENT DOCUMENTS

| | | |
|---|---|---|
| JP | S6126826 | 2/1986 |
| WO | WO2015082505 | 6/2015 |

\* cited by examiner

[Fig. 1]
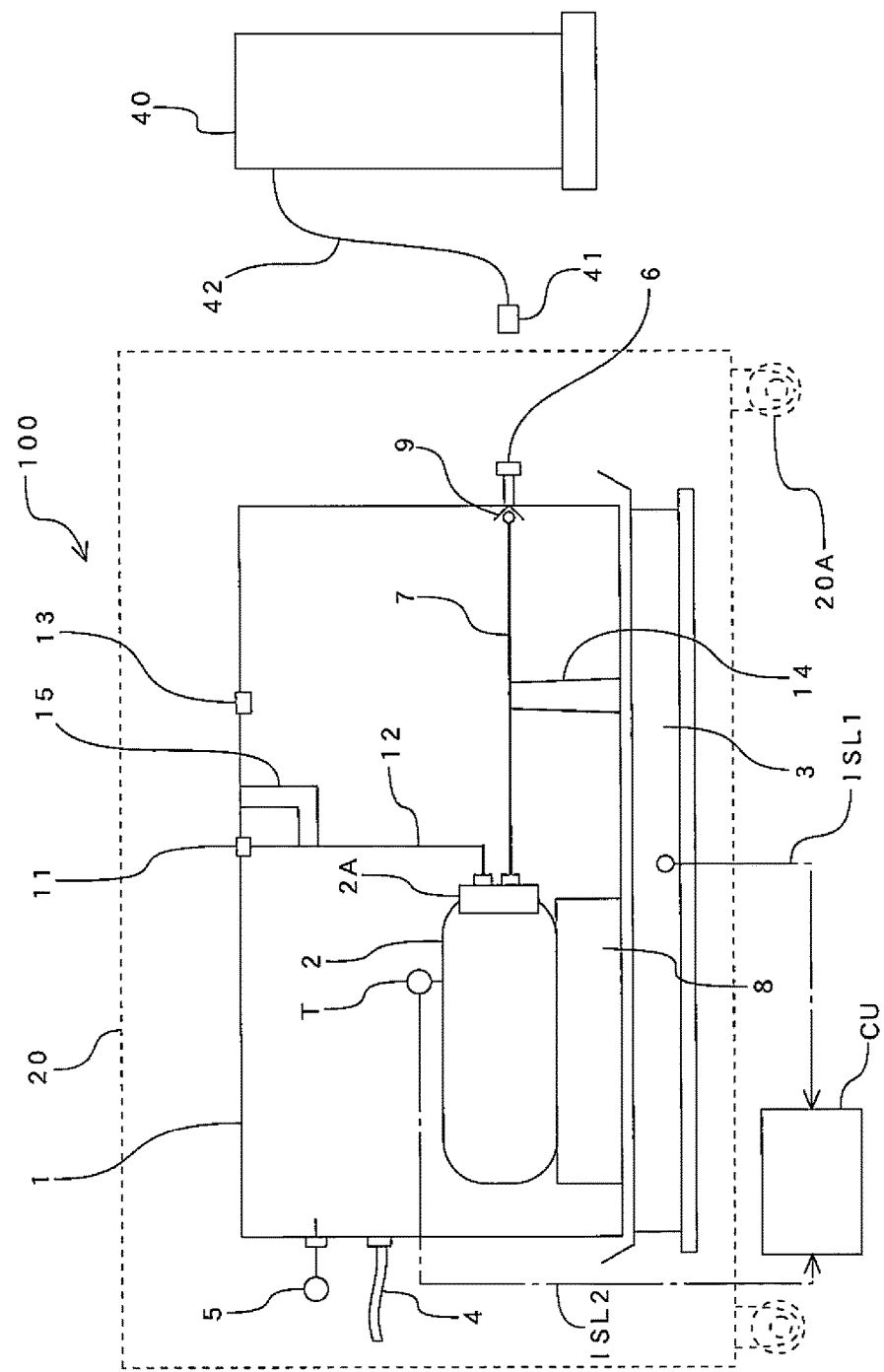

[Fig. 2]
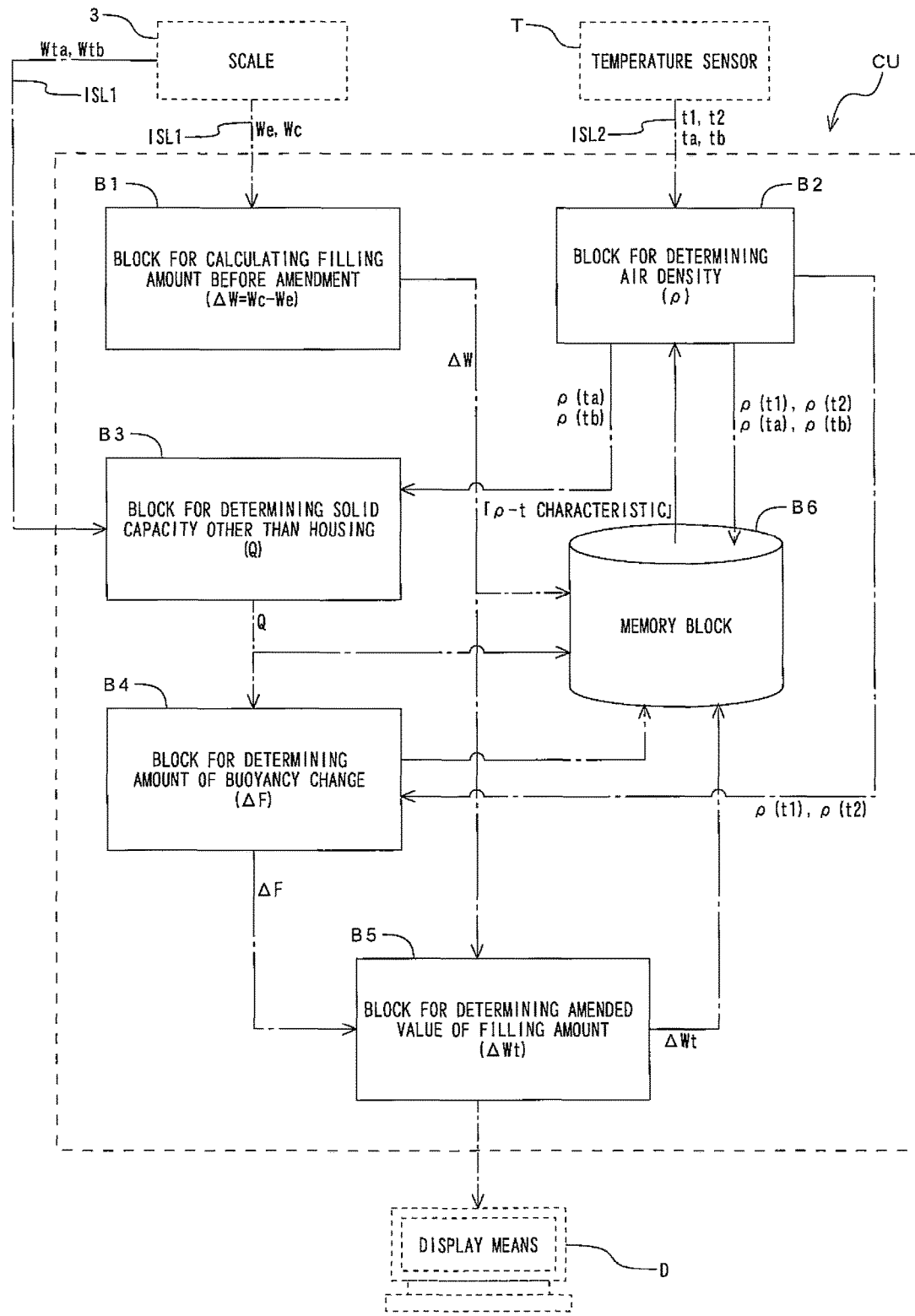

[Fig. 3]
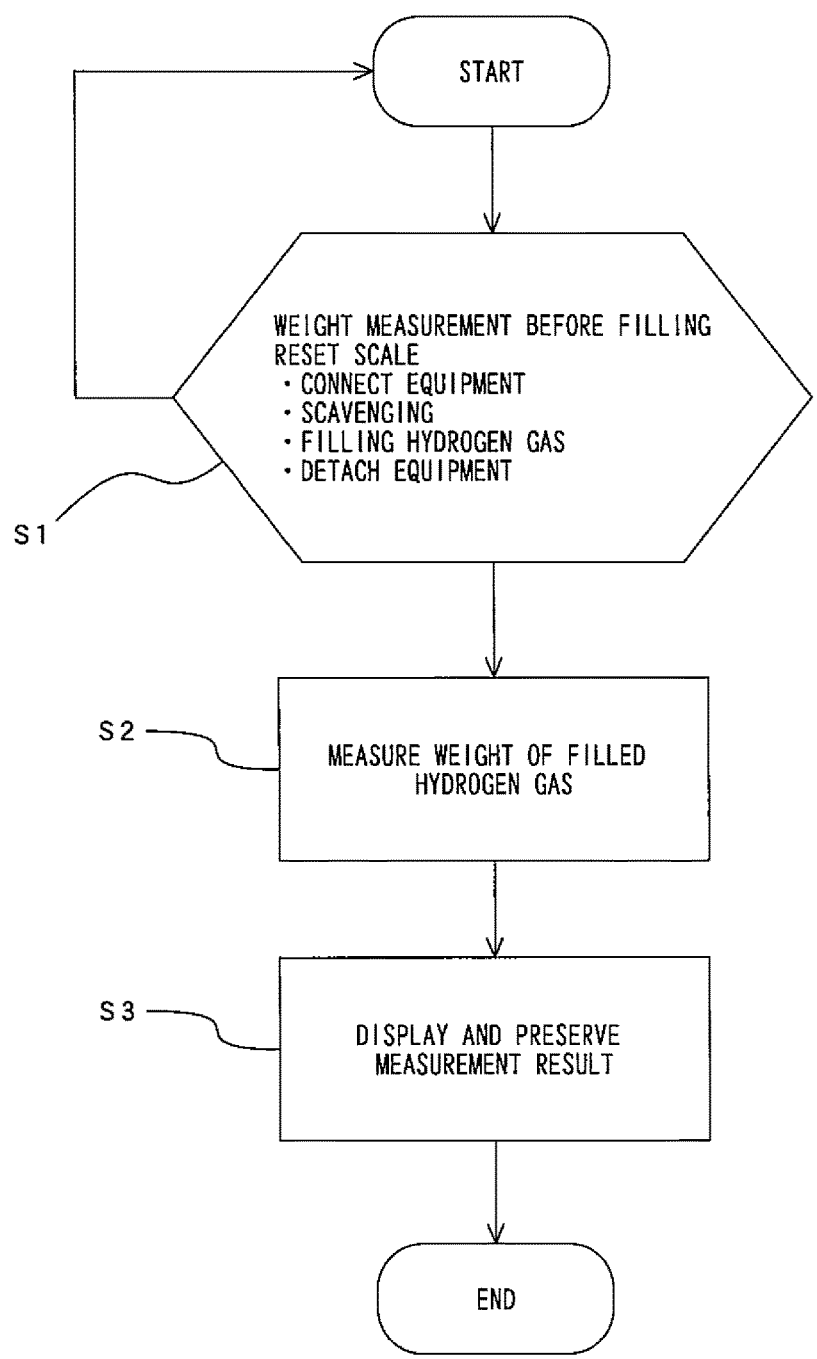

[Fig. 4]
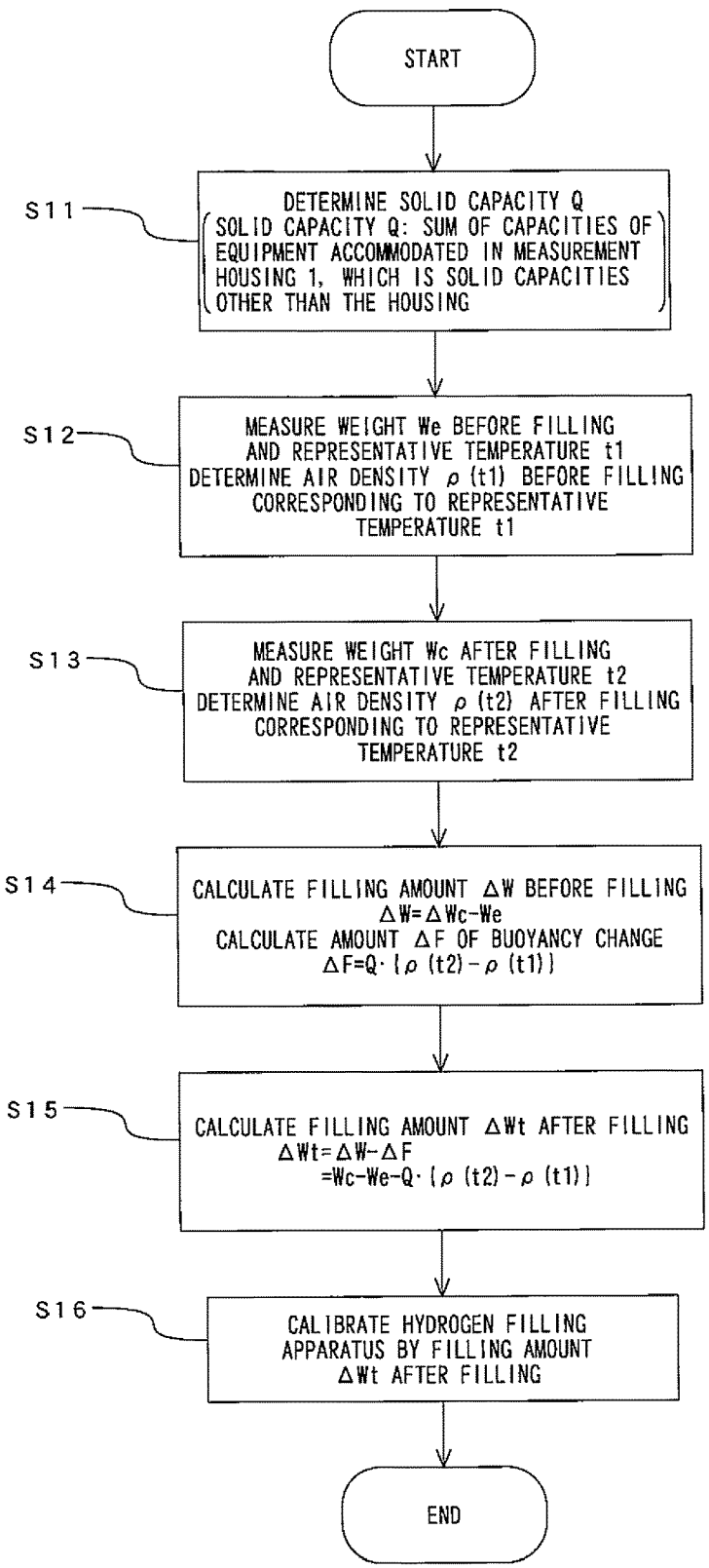

[Fig. 5]
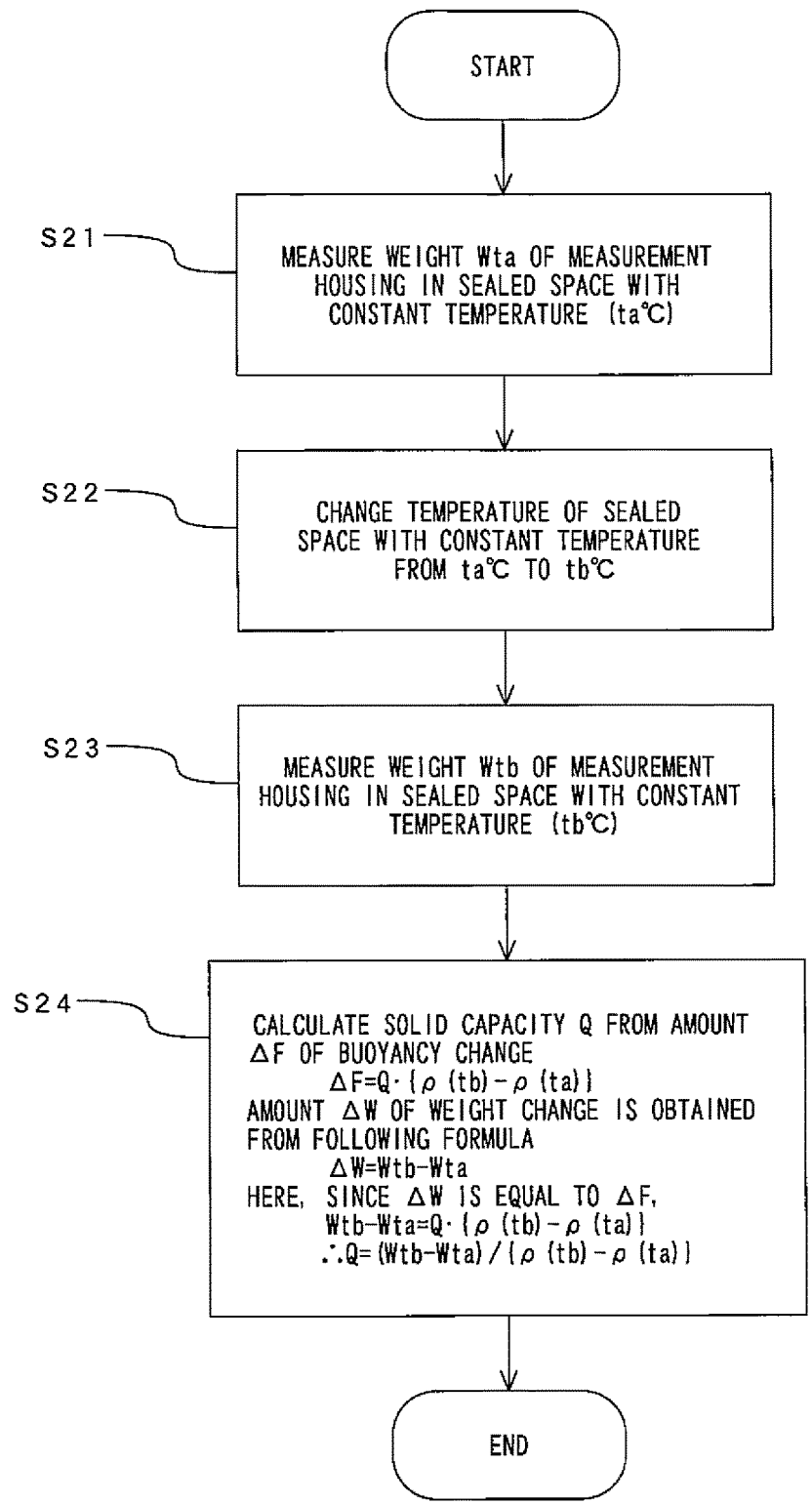

CALIBRATION DEVICE AND CALIBRATION METHOD

CROSS-REFERENCE TO RELATED APPLICATIONS

The present application claims priority to Japanese Patent Application No. 2015-189397 filed on Sep. 28, 2015, the disclosure of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a calibration device for apparatus filling a gas such as hydrogen gas, and more particularly to a calibration device capable of precisely measuring quantity of a gas such as hydrogen gas filled at high pressure.

2. Description of the Related Art

Gasoline meters installed in filling stations are obliged to take flow rate verification every seven years to maintain fair business dealing, and it is requested that instrumental error of the flow meter is within ±0.5 percent. To such request, the applicant proposes a gasoline meter with inspection mechanism of flow meters in Japanese Patent Publication No. Heisei 07-33197.

In recent years, as a countermeasure for environmental issue, fuel-cell automobiles using hydrogen as fuel have been developed, accordingly hydrogen filling apparatus and calibration devices for the hydrogen filling apparatus have been investigated.

At the calibration for the hydrogen filling apparatus, there are calibration devices for performing the calibration by comparing weights of the calibration device before and after hydrogen is filled thereto; calculating amount or weight of the filled hydrogen from the difference; and comparing the amount of the filled hydrogen with a filled amount measured by a flow meter of the hydrogen filling apparatus.

In the filling of the hydrogen, high pressure filling is adopted to shorten the filling time, but temperature of the gas increases in association with the high pressure filling, and fuel tanks of fuel-cell vehicles become high in temperature, which may cause breakage of the fuel tanks. In order to prevent the possibility, hydrogen is filled while being cooled at −40° C. with a cooling device.

But, when the hydrogen, which has been cooled at −40° C., is filled in the calibration device for the hydrogen filling apparatus, temperature of the calibration device varies, which causes buoyant force acting on the calibration device by an ambient gas to change. And, there is a problem that by the variation of the buoyant force, in the calibration devices for measuring the weight of the filled hydrogen, errors generate in the measured amount or weight of the filled hydrogen.

The contents of Japanese Patent Publication No. Heisei 07-33197 is incorporated herein by reference in its entirety.

SUMMARY OF THE INVENTION

The present invention has been made in consideration of the above problems in the conventional arts, and the object thereof is to provide a calibration device for a filling apparatus for a gas such as hydrogen gas and capable of accurately measuring amount of the gas such as hydrogen gas filled at high pressure, and a calibration method with the calibration device.

A calibration device 100 according to the present invention is characterized by including: a filling vessel 2, accommodated in a measurement housing 1, to the filling vessel 2 a high pressure fuel gas such as hydrogen gas being fed from outside of the measurement housing 1; a scale 3 for measuring a weight of a fuel gas fed to the filling vessel 2; and a control device CU for eliminating an error caused by changing buoyant force from a gas in the measurement housing before and after filling the fuel gas.

Then, a calibration method for a fuel gas filling apparatus 40 with the calibration device 100, is characterized by including the steps of: measuring weights of the measurement housing 1 before and after filling the fuel gas; and eliminating an error caused by changing buoyant force from a gas in the measurement housing before and after filling the fuel gas from an difference of weights of the measurement housing 1 before and after filling fuel gas.

In the present invention, it is preferable that the control device CU calculates a buoyant force acting on sum (solid capacity Q) of capacities of equipment such as the filling vessel 2, the scale 3, a pedestal 8 and a filling gas feeding pipe 7 accommodated in the measurement housing 1 only to eliminate an error caused by changing buoyant force from gas such as dried air and nitrogen in the measurement housing before and after filling the fuel gas such as hydrogen gas.

Then, in the calibration method of the present invention also, in the step for eliminating the error caused by changing buoyant force from gas such as dried air and nitrogen in the measurement housing before and after filling the fuel gas such as hydrogen gas, it is preferable that calculation of the buoyant force from the gas such as dried air and nitrogen in the measurement housing 1 is performed to a buoyant force acting on sum of capacities of equipment, such as the filling vessel 2, the scale 3, the pedestal 8 and the filling gas feeding pipe 7, accommodated in the measurement housing only except for capacities of materials forming the measurement housing 1.

When the present invention is carried out, it is preferable that when the buoyant force from the gas such as dried air and nitrogen in the measurement housing 1 is calculated, gas temperature on the surface of the filling vessel 2 is calculated to determine gas density ρ from the gas temperature.

Then, it is preferable that a dry gas pipe 4 for feeding dry gas in the measurement housing 1 is detachably mounted to the measurement housing 1. Here, it is preferable that the scale 3 measures a weight of the fuel gas fed to the filling vessel 2 together with that of the measurement housing 1.

In the present invention, the measurement housing 1 is preferably semi-enclosed structure.

Here, "semi-enclosed structure" means a structure realizing not perfectly sealed state, but nearly sealed state.

In addition, in the present invention, a dew-point instrument 5 for measuring a dew-point temperature in the measurement housing 1 is preferably mounted. The dew-point instrument 5 can be detachably mounted not only on the outside of the measurement housing 1, but also on the inside thereof. When the present invention is carried out, as the dry gas can be used nitrogen or dried air.

With the present invention with the above construction, since the control device has a function of eliminating an error caused by buoyant force from the gas such as dried air and nitrogen in the measurement housing 1 before and after filling the fuel gas such as hydrogen gas, and a process for eliminating the error is preformed, even when the buoyant force varies before and after the filling fuel gas, it is prevented that an error is generated in measurement result of the fuel gas filling amount. As a result, in the measurement of the fuel gas filling amount for which high accuracy is required, harmful effects due to changes in the buoyant force can be eliminated, so that accuracy at the determination of the fuel gas filling amount can be improved, which can improve accuracy at the calibration for the hydrogen gas filling apparatus 40.

In the present invention, when eliminating the harmful effects due to changes in the buoyant force from the gas in the measurement housing 1, a buoyant force acting on sum (solid capacity Q) of capacities of equipment such as the filling vessel 2, the scale 3, the pedestal 8 and the filling gas feeding pipe 7 accommodated in the measurement housing 1 only is considered, and a buoyant force from the gas acting on a capacity AQ, which is the capacity of the measurement housing 1 minus the solid capacity Q is not considered, which exactly matches the inventor's investigations and experiment results.

The buoyant forces from the gas acting on a capacity AQ, which is the capacity of the measurement housing 1 minus the solid capacity Q, is canceled out when the weights of the measurement housing 1 before and after the filling fuel gas are measured, and the difference is calculated from the weights. Therefore, when considering variations of the buoyant force, including the buoyant force from the gas acting on a capacity AQ makes the variations of the buoyant force inaccurate.

Here, when the buoyant force from the gas such as dried air and nitrogen in the measurement housing 1 is calculated, temperature in the measurement housing 1 greatly varies due to measuring time and position. Therefore, gas density ρ and the buoyant force from the gas varies.

In the present invention, when the buoyant force from the gas such as dried air and nitrogen in the measurement housing 1 is calculated, calculating gas temperature on the surface of the filling vessel 2 to determine the gas density ρ from the gas temperature can adopt the gas temperature on the surface of the filling vessel 2 as a representative value to determine the gas density ρ from the representative value. With this, regardless of variations of the gas temperature by the measuring time and position, it is possible to calculate the buoyant force from the gas in the measurement housing 1 to eliminate an error due to the buoyant force variations.

Then, it is confirmed in the inventor's investigations and experiments that a result obtained by determining the gas temperature on the surface of the filling vessel 2 as the representative value accurately corresponds to the gas density ρ calculated by complex calculations considering heat transmission, radiation and time course. That is, if the gas density ρ is determined when the gas temperature on the surface of the filling vessel 2 is adopted as the representative value, without performing the complex calculations considering the heat transmission, the radiation and the time course, effect by the buoyant force can be calculated to perform the calibration with the same accuracy as a case that the complex calculations are performed.

BRIEF DESCRIPTION OF THE DRAWINGS

FIG. 1 is a block diagram showing an embodiment of the present invention;

FIG. 2 is a functional block diagram showing a control unit in the embodiment;

FIG. 3 is a flow chart showing a procedure for calibration in the embodiment;

FIG. 4 is a flow chart showing a control for amending a weight measured while considering a buoyant force in the embodiment;

FIG. 5 is a flow chart showing a control for determining a solid capacity.

DETAILED DESCRIPTION

Next, an embodiment of the present invention will be explained with reference to the drawings.

In FIG. 1, a calibration device according to the embodiment of the present invention is totally shown by a numeral character 100. The calibration device 100 is provided with: a measurement housing 1; a filling vessel 2, accommodated in the measurement housing 1, to the filling vessel 2 a high pressure fuel gas being fed from outside of the measurement housing 1; and a scale 3 for measuring weight of the measurement housing 1; and a main body housing 20 for accommodating the measurement housing 1 and a scale 3. The filling vessel 2 is mounted on a bottom face of the measurement housing 1 through a pedestal 8.

The weights of the measurement housing 1 before and after filling hydrogen gas are measured by the scale 3, and the weight of the hydrogen gas fed to and filled in a filing vessel 2 is calculated from the difference between the both weights. Hereinafter, the explanation will be made when hydrogen gas is adopted as a fuel gas.

The measurement housing 1 accommodating the filling vessel 2 and so on, and the main body housing 20 accommodating the scale 3 have moving means 20A such as wheels on their lower face, and they can move to a position at a calibration where an apparatus to be calibrated such as a hydrogen filling apparatus is installed.

On a side face of the measurement housing 1 is mounted a receptacle 6 as a hydrogen reception port, and when hydrogen gas is fed to and filled in the filling vessel 2 in the measurement housing 1 from the hydrogen filling apparatus 40 to be calibrated, the receptacle 6 becomes the hydrogen reception port on the side of the measurement housing 1. That is, the hydrogen filling apparatus 40 and the measurement housing 1 are connected by the coupling of the filling nozzle 41 and the receptacle 6, and hydrogen gas is fed from the hydrogen filling apparatus 40 to the filling vessel 2 in the measurement housing 1. The numeral 42 shows a hydrogen filling pipe.

In the measurement housing 1, the receptacle 6 and the filling vessel 2 are connected by the filling gas supply pipe 7. The hydrogen gas fed from the receptacle 6 to the measurement housing 1 is fed to and filled in the filling vessel 2 through the filling gas supply pipe 7.

In addition, the numeral 2A indicates a filling gas intake portion of the filling vessel 2, and the numeral 9 shows a check valve for preventing backflow of the hydrogen gas fed on the side of the measurement housing 1.

On the side face of the measurement housing 1 is detachably mounted a dry gas pipe 4 for feeding a dry gas such as dry air and nitrogen to the measurement housing 1. The dry gas is fed from a supply source not shown to the measurement housing 1 through the dry gas pipe 4, and the dry gas can be filled in the measurement housing 1.

Here, as the dry gas can be utilized inert gas such as nitrogen, and dried air. Besides nitrogen and dried air are used, any gases that can be obtained at low cost; easily filled into or discharged from the measurement housings 1 for a short period of time; have a characteristic contributing to improvement of safety; and have a molecular weight similar to the air and nitrogen. When a gas whose molecular weight is greatly different from air and nitrogen is used, it is necessary to confirm that the gas concentration is stable or to amend the gas concentration after it is measured.

Further, on the outer face of the measurement housing 1 is detachably mounted a dew-point instrument 5. Therefore, based on measured results of the dew-point instrument 5, it becomes possible to properly perform humidity management in the measurement housing 1. For example, when the dew-point temperature in the measurement housing 1 is a prescribed temperature, which is −20° C. for instance, that is a dew-point temperature that can be judged it is sufficiently dried in the measurement housing 1, and a fuel gas, for example, hydrogen gas that is cooled at −40° C., is fed, amount of dews condensing on the filling vessel 2, the filling gas supply pipe 7, the receptacle 6 and other parts become few, so that the amount hardly effects on the weight measurements.

Here, decreasing the dew point to −40° C. or less for instance causes the amount of the condensing dew to become zero, but the difference between the amount at −40° C. or less and that at −20° C. or less is small. Therefore, it is realistic and economical that the dew-point temperature is set from −20° C. to −25° C. as a reference dew-point temperature that can be judged to be necessarily and sufficiently dried.

In the embodiment shown in the drawings, the dew-point instrument 5 is mounted outside of the measurement housing 1, but can be mounted inside of the measurement housing 1.

Further, a control device not shown for transmitting measured values by the dew-point instrument 5 via infrared communication to the hydrogen filling apparatus 40 can be arranged to the dew-point instrument 5, which can control, with a simple construction, the hydrogen filling apparatus 40 so as to start the filling when the dew-point temperature in the measurement housing 1 reaches the predetermined temperature.

On the upper face of the measurement housing 1 is mounted a gas outlet 13, which becomes an outlet for discharging air and other gases with moisture outside of the measurement housing 1 when the dry gas is filled therein. Further, on the upper face of the measurement housing 1 is mounted the filling gas outlet 11, which is connected to the filling vessel 2 through a filling gas release pipe 12.

In case that the hydrogen gas is discharged from the filling vessel 2, the hydrogen gas discharged from the filling vessel 2 is discharged through the filling gas release pipe 12 from the filling gas outlet 11 outside of the measurement housing 1. Not shown in the drawings, the main body housing 20 includes a gas release mechanism also.

The filling gas supply pipe 7 is fixed to a bottom face portion of the measurement housing 1 by a supporting member 14. In addition, the filling gas release pipe 12 is fixed to an outer wall portion of the measurement housing 1 by a supporting member 15. As constructions with the supporting member 14 and the supporting member 15 respectively to fix the filling gas supply pipe 7 and the filling gas release pipe 12 to the measurement housing 1, various conventional constructions can be utilized.

The pedestal 8 on which the supporting members 14 and 15 and the filling vessel 2 are mounted is formed of a heat insulating material with low heat conductivity such as rubber and resin. The reason is since low temperature in the measurement housing 1 conducts through the supporting members 14 and 15, and the pedestal 8 to an outer face of the measurement housing 1, it should be prevented that dew condenses on the measurement housing 1 and an outer face of the scale 3 that contact with the atmosphere.

Here, the measurement housing 1 is semi-enclosed structure. "Semi-enclosed structure" means a structure realizing not perfectly sealed state, but nearly sealed state. With this, feeding the dry gas in the measurement housing 1 makes an inner part of the measurement housing 1 slightly pressurized, so that it is prevented that air with moisture enters into the measurement housing 1.

In FIG. 1, the symbol CU shows a control unit as a control device for performing a control for eliminating an error by buoyant force from gas such as dried air and nitrogen in the measurement housing 1. The control unit CU is connected to the scale 3 through an input signal line ISL1, and is connected to the temperature sensor T through an input signal line ISL2. Here, the temperature sensor T is disposed near the surface of the filling vessel 2.

Details on the control unit CU will be explained while referring to the functional block diagram shown in FIG. 2. In FIG. 2, the control unit CU is provided with: a block B1 for calculating filling amount before amendment; a block B2 for determining air density; a block B3 for determining solid capacity; a block B4 for determining amount of buoyant force change; a block B5 for determining amended value of filling amount; and a memory block B6. Hereinafter, function of each functional block will be explained.

The block B1 for calculating filling amount before amendment calculates filling amount ΔW of hydrogen gas before amendment considering a buoyant force from a gas such as dried air and nitrogen in the measurement housing 1. That is, the block B1 for calculating filling amount before amendment acquires data on weight We of the measurement housing 1 before filling hydrogen gas, which is data measured by the scale 3, and data on weight We of the measurement housing 1 after filling hydrogen gas from the input signal line ISL1; and calculates, from the difference of these weights, the amount ΔW of hydrogen gas filled in the filling vessel 2. The hydrogen gas filling amount ΔW is calculated from a formula, which is ΔW=Wc−We.

Further, the block B1 for calculating filling amount before amendment separately transmits measurement result of the hydrogen gas filling amount ΔW to the block B5 for determining amended value of filling amount and the memory block B6.

The block B2 for determining air density determines a gas density ρ in the measurement housing 1 at a predetermined temperature. The block B2 for determining air density acquires measurement data t1, t2, ta, tb by temperature sensor T mounted to the surface of the filling vessel 2 from the input signal line ISL2; and determines the gas density ρ in the measurement housing 1 at the temperature based on characteristic data showing a relationship between air density ρ and temperature t acquired from the memory block B6. Here, as the characteristic data showing the relationship between air density ρ and temperature t, conventionally known characteristic data can be used.

The density ρ determined in the block B2 for determining air density will be described later while referring to FIGS. 4 and 5. Meanwhile, in the embodiment shown in the drawings, there are gas densities ρ(t1) and ρ(t2) at the temperatures t1° C. and t2° C., and gas densities ρ(ta) and ρ(tb) at the temperatures ta° C. and tb° C.

The gas densities ρ(ta) and ρ(tb) determined in the block B2 for determining air density are transmitted to the block B3 for determining solid capacity, and the gas densities ρ(t1)

and ρ(t2) are transmitted to the block B4 for determining amount of buoyant force change. In addition, the determined gas densities ρ(ta), ρ(tb), ρ(t1) and ρ(t2) are transmitted to the memory block B6 also.

The block B3 for determining solid capacity calculates and determines, based on the weights Wta and Wtb of the measurement housing 1 whose sealed thermostatic space, which has an uniform temperature distribution without rapid temperature change, and the gas densities ρ(ta) and ρ(tb) at the temperature, sum Q of capacities, which are those of the filling vessel 2, the scale 3, the pedestal 8, the filling gas feeding pipe 7 and so on in the housing 1, but which exclude those of members configuring the measurement housing 1. Then, the block B3 for determining solid capacity acquires data on the gas densities ρ(ta) and ρ(tb) corresponding to the temperatures ta° C. and tb° C. from the block B2 for determining air density, and acquires the measurement data Wta and Wtb of the measurement housing 1 corresponding to the temperatures ta° C. and tb° C. through the first input signal line ISL1 from the scale 3.

The B3 block for determining solid capacity calculates and determines the solid capacity Q based on the variation amount of density ρ{ρ(tb)−ρ(ta)} and the variation amount of the weight (buoyant force) of the measurement housing 1 (Wtb−Wta).

Described later while referring to FIG. 5, the solid capacity Q can be calculated from the following formula.

Solid capacity $Q=(Wtb-Wta)/\{\rho(tb)-\rho(ta)\}$

Further, the block B3 for determining solid capacity transmits the solid capacity Q determined through the formula to the block B4 for determining amount of buoyant force change and the memory block B6.

The block B4 for determining amount of buoyant force change calculates and determines variation amount ΔF of buoyant force from the gas before and after filling hydrogen gas based on the solid capacity Q and gas densities ρ(t1) and ρ(t2) in the measurement housing 1 before and after filling hydrogen gas.

The block B4 for determining amount of buoyant force change acquires data on the solid capacity Q from the block B3 for determining solid capacity, and data on the gas densities ρ(t1) and ρ(t2) corresponding to temperatures t1° C. and t2° C. before and after filling hydrogen gas from the block B2 for determining air density.

Then, the block B4 for determining amount of buoyant force change calculates and determines the variation amount ΔF of buoyant forces before and after filling hydrogen gas from the solid capacity Q and the variation amount of density ρ{ρ(t2)−ρ(t1)} at the temperatures t1° C. and t2° C. before and after filling hydrogen gas.

The variation amount ΔF of the buoyant forces will be described later while referring to FIG. 4, since the buoyant forces F equals the capacity Q times the density ρ, the variation amount ΔF of buoyant forces is calculated from the next formula, $\Delta F=Q\cdot\{\rho(t2)-\rho(t1)\}$.

Further, the block B4 for determining amount of buoyant force change separately transmits the determined variation amount ΔF of buoyant forces to the block B5 for determining amended value of filling amount and the memory block B6.

The block B5 for determining amended value of filling amount amends the hydrogen gas filling amount based on the variation amount ΔF of buoyant forces before and after filling hydrogen gas, and calculates and determines hydrogen gas filling amount ΔWt after amendment.

In other words, the block B5 for determining amended value of filling amount acquires data on the hydrogen gas filling amount ΔW (=Wc−We) from the block B1 for calculating filling amount before amendment and data on the variation amount ΔF of buoyant forces before and after filling hydrogen gas from the block B4 for determining amount of buoyant force change, and calculates and determines amended value of the filling amount ΔWt.

Described later while referring to FIG. 4, the amended value ΔWt of filling amount can be calculated from the following formula.

$\Delta Wt=Wc-We-\Delta F$

Further, the block B5 for determining amended value of filling amount separately transmits the amended value ΔWt of filling amount to display means D (a display etc.) and the memory block B6 located outside the control unit CU.

The amended value ΔWt of filling amount is displayed on display means D as a calibration result, and is memorized in the memory block B6. In the memory block B6 are memorized the characteristic data showing a relationship between air density ρ and temperature t, results determined by the functional blocks B1-B5 (ΔW, ρ, Q, ΔF and ΔW) and the like, and these data and results are referred by the functional blocks B1-B5.

Next, a procedure of calibration using the calibration device 100 shown in FIG. 1 will be explained while referring to FIG. 3. In the flowchart of calibration shown in FIG. 3, in the step S1, at first, a weight of the measurement housing 1 before hydrogen gas is filled is measured by the scale 3 under a condition that the dry gas pipe 4 and the filling nozzle 41 are not connected.

Then, the dry gas pipe 4 and the filling nozzle 41 are connected, and air and other gases with moisture in the measurement housing 1 are discharged as a scavenging work, and the hydrogen gas is filled from the hydrogen filling apparatus 40 to be calibrated to the filling vessel 2 as a filling work, and the dry gas pipe 4 and the filling nozzle 41 are disconnected as a disconnecting work.

Describing in detail, as the connecting work in the step S1, the dry gas pipe 4 is connected to one side face of the measurement housing 1. And, the filling nozzle 41 of the hydrogen filling apparatus 40 is connected to the receptacle 6 mounted on the side face of the measurement housing 1.

In the scavenging work, the dry gas is fed to and filled in the measurement housing 1 from a dry gas supply source not shown through the dry gas pipe 4. Filling the dry gas in the measurement housing 1 allows a gas with moisture such as air existing in the measurement housing 1 to be discharged through the gas outlet 13 outside of the measurement housing 1.

The scavenging work is performed while monitoring the measured value by the dew-point instrument 5 at any time. As the scavenging proceeds, the dew-point temperature gradually decreases and humidity in the measurement housing 1 decreases. When the dew-point temperature reaches a predetermined temperature such as −20° C., it is judged that it is sufficiently dried in the measurement housing 1.

By the scavenging work in the step S1, as described above, in case that the dew-point temperature reaches the predetermined temperature, and it can be judged that it is sufficiently dried in the measurement housing 1, the filling work in the step S1 is performed. The filling hydrogen gas is performed until a pressure gauge not shown of the hydrogen filling apparatus 40 judges that a predetermined amount of hydrogen gas is fed. After the filling work is finished, the disconnecting work in the step S1 is performed.

In the disconnecting work, the dry gas pipe 4 and the filling nozzle 41 are disconnected. When the step S1 is finished, the procedure moves to the step S2.

In the step S2, a weight that the hydrogen gas is filled from the hydrogen filling apparatus 40 to the filling vessel 2 in the measurement housing 1 (a weight of the measurement housing 1 after the hydrogen gas is filled) is measured by the scale 3.

Then, measured results of the weights of the measurement housing 1 before and after the hydrogen gas is filled, the weight of the hydrogen gas filled in the filling vessel 2 is calculated to calculate the filling amount of the hydrogen gas. And, the calculated filling amount is compared to filling amount determined based on the flow meter of the hydrogen filling apparatus 40 to be calibrated, which performs a calibration of the hydrogen filling apparatus 40. In this case, in the embodiment shown in the drawings is performed a control or a procedure for eliminating an error caused by changing buoyant force from a gas such as dried air and nitrogen in the measurement housing 1 before and after filling the hydrogen gas from the measurement results of weight of the measurement housing 1. The control will be described later while referring to FIGS. 4 and 5. When the step S2 is finished, the procedure moves to the step S3.

In the step S3 are displayed the weight value of the hydrogen gas that is the measured result in the step S2, the filling amount of the hydrogen gas calculated based on the weights of the measurement housing 1 before and after the filling, and the calibration result, to a display and so on not shown.

Further, the filling amount of the hydrogen gas that is the measured result, or the weight of the filled hydrogen gas is preserved to a memorizing device of an information processor such as a PC not shown together with an identification number such as a product number of the hydrogen filling apparatus 40 to be calibrated, and day and time performing the calibration. Then, the calibration procedure is finished.

Not shown in FIG. 3 clearly, but, in case that the calibrations for other object apparatus are continuously performed by the calibration device 100, after the step S3, the hydrogen gas filled in the filling vessel 2 is discharged outside of the measurement housing 1 through the filling gas release pipe 12 and the filling gas discharging port 11.

In case that the calibrations for other hydrogen filling apparatus 40 are continuously performed, the procedure returns to "START" in FIG. 3, and works in the steps S1-S3 are performed. Further, discharging of the hydrogen gas filled in the filling vessel 2 can be performed while the scale has been reset in the step S1 of the calibration for next object apparatus.

Not shown in FIG. 3 clearly, in the embodiment shown in the drawings is performed a control or a procedure for eliminating an error caused by changing buoyant force from gas such as dried air and nitrogen in the measurement housing 1 before and after filling hydrogen gas. The control will be explained later while referring to mainly FIG. 4 and together with FIGS. 1 and 2.

It is found in the inventor's investigations and experiments that the buoyant force due to a gas such as dried air and nitrogen in the measurement housing 1 is different from those acting to the whole capacity of the measurement housing 1, and the buoyant force is those acting to the equipment including the filling vessel 2, the scale 3, the pedestal 8 and the filling gas feeding pipe 7 accommodated in the measurement housing 1. In other words, the buoyant force from a gas such as dried air and nitrogen in the measurement housing 1 is the buoyant force acting on sum (solid capacities other than that of the measurement housing 1, hereinafter "Q" is attached) of capacities of the equipment accommodated in the measurement housing 1.

It is assumed that before and after the filling hydrogen gas, buoyant forces from the gas acting on a capacity (hereinafter, symbol "AQ" is attached) that is a remainder of substruction of the solid capacity Q from the capacity of the measurement housing 1 are the same, so that the buoyant forces acting on the capacity AQ are cancelled out.

In other words, the buoyant forces from the gas acting on the capacity AQ, which is the difference between the measurement housing 1 and the solid capacity Q, are canceled out when the weights of the measurement housing 1 before and after the filling hydrogen gas are measured to calculate the difference thereof, so that it does not relate to decision of the hydrogen gas filling amount.

Based on this point of view, in the step S11 shown in FIG. 4, the solid capacity Q, which is sum of capacities of equipment such as the filling vessel 2, the scale 3, the pedestal 8 and the filling gas feeding pipe 7 accommodated in the measurement housing 1 of the calibration device 100 except for that of the measurement housing 1 is determined. A control or a procedure for determining the solid capacity Q in the step S11 will be described later while referring to FIG. 5.

The decision of the solid capacity Q is performed before calibration in advance, but the solid capacity Q can be determined at the calibration. When the solid capacity Q is determined, the control moves to the step S12

Here and after the step S12, when the buoyant force from the gas such as dried air and nitrogen in the measurement housing 1 is calculated, from temperature of the gas, with the characteristic data showing a relationship between air density $\rho$ and temperature t (a conventionally known data), density thereof is determined. Here, the gas temperature in the measurement housing 1 greatly varies due to measuring time and position.

In the steps S12 and S13, through the temperature sensor T mounted on the surface of the filling vessel 2 is measured temperature of the gas, and from the measured gas temperature is determined the gas density $\rho$. That is, as a representative value of the gas temperature in the measurement housing 1 is adopted the gas temperature on the surface of the filling vessel 2, and from the representative value is determined the gas density $\rho$. With this, regardless of temperature variations due to time and measuring position, the buoyant forces from the gas in the measurement housing 1 are calculated, and the error by the variation of the buoyant forces can be eliminated.

It was confirmed in the inventor's investigations and experiments that a result obtained by determining the gas temperature on the surface of the filling vessel 2 as the representative value accurately corresponds to the gas density $\rho$ calculated by complex calculations considering heat transmission, radiation and time course. That is, determining the gas density $\rho$ based on the gas temperature on the surface of the filling vessel 2 as the representative value allows, without performing the complex calculations considering the heat transmission, the radiation and the time course, the calibration with the same accuracy as a case that the complex calculations to be performed while calculating effect of the buoyant force.

In the step S12 shown in FIG. 4, the weight of the measurement housing 1 We and the representative temperature t1 before filling hydrogen gas are measured. The representative temperature t1 is, as described above, the gas temperature on the surface of the filling vessel 2. Then, gas density ρ(t1) corresponding to the representative temperature t1 is calculated from the characteristic data showing a relationship between air density ρ and temperature t. As a result, in the step S12 are determined the weight We of the measurement housing 1 and the gas density ρ(t1) before the filling. When the step S12 is finished, the procedure moves to the step S13.

In the step S13 are measured weight Wc of the measurement housing 1 and representative temperature t2 after the filling. Then, from the characteristic data showing a relationship between air density ρ and temperature t is calculated the gas density ρ(t2) corresponding to the representative temperature t2. As a result, in the step S13 are determined the weight Wc of the measurement housing 1 and the gas density ρ(t2) after the filling. When the step S13 is finished, the procedure moves to the step S14.

In the next step S14 is calculated hydrogen gas filling amount ΔW before amendment considering buoyant forces from the gas. The hydrogen gas filling amount ΔW is calculated based on the weights We, Wc of the measurement housing 1 before and after the filling hydrogen gas, from the next formula, filling amount ΔW=Wc−We.

In addition, in the step S14 is calculated variation amount ΔF of buoyant forces from the gas before and after filling hydrogen gas. The variation amount ΔF of buoyant forces of the gas is calculated based on the solid capacity Q determined in the step S11, and gas densities ρ(t1) and ρ(t2) determined in the steps S12 and S13, from the following formula.

$$\Delta F = Q \cdot \{\rho(t2) - \rho(t1)\}$$

As a result, in the step S14 are calculated the hydrogen gas filling amount ΔW before amendment, the variation amount ΔF of buoyant forces from the gas. When the step S14 is finished, the procedure moves to the step S15.

In the step S15 is calculated hydrogen gas filling amount ΔWt after amendment considering buoyant forces from the gas. The hydrogen gas filling amount ΔWt after amendment considering buoyant forces from the gas is calculated based on the result calculated in the step S14, from the following formula.

$$\Delta Wt = \Delta W - \Delta F$$

$$\therefore \Delta Wt = Wc - We - Q \cdot \{\rho(t2) - \rho(t1)\}$$

When the step S15 is finished, the procedure moves to the step S16.

In the step S16, with the filling amount ΔWt after amendment, as described in the step S3 shown in FIG. 3, calibration of the hydrogen filling apparatus 40 is performed. Therefore, it is possible to eliminate an error caused by changing buoyant force from the gas such as dried air and nitrogen in the measurement housing 1 before and after filling hydrogen gas, and the control is finished. Meanwhile, the control for eliminating an error caused by changing buoyant force from the gas such as dried air and nitrogen in the measurement housing 1 before and after filling the hydrogen gas is performed in the step S2 shown in FIG. 3, for instance. Or, it can be performed in the step S3.

In the step S11 shown in FIG. 4, as described above, the solid capacity Q, which is sum of capacities of equipment such as the filling vessel 2, the scale 3, the pedestal 8 and the filling gas feeding pipe 7 accommodated in the measurement housing 1 of the calibration device 100 except for those of members configuring the measurement housing 1 is determined. Next, the control for determining the solid capacity Q will be explained while particularly referring to FIG. 5.

Not shown in the drawings clearly, but measurement of the solid capacity Q, which is sum of capacities of equipment such as the filling vessel 2, the scale 3, the pedestal 8 and the filling gas feeding pipe 7 accommodated in the measurement housing 1 except for those of members configuring the measurement housing 1 is performed under a condition that the inside of the measurement housing 1 is a sealed thermostatic space that has an uniform temperature distribution without rapid change in temperature.

In the step S21, the inside of the measurement housing 1 is regarded as a sealed thermostatic space whose temperature is ta° C. (on the surface of the filling vessel 2), and weight Wta of the whole measurement housing 1 through the scale 3 shown in FIG. 1 (the temperature ta° C. is measured through the temperature sensor T).

In the next step S22, temperature inside the measurement housing 1 gradually varies to make it a sealed thermostatic space whose temperature is tb° C. (on the surface of the filling vessel 2). Then, in the step S23 is measured weight Wtb of the whole measurement housing 1, which is the sealed thermostatic space whose temperature is tb° C.

In the step S24, based on measurement results in the steps S21 and S23, the solid capacity Q is calculated and determined. A procedure for determining the solid capacity Q will be explained later.

As the temperature inside the measurement housing 1 varies from ta° C. to tb° C., gas density ρ inside the measurement housing 1 also varies from ρ(ta) to ρ(tb).

As described above, the buoyant force from the gas such as dried air and nitrogen in the measurement housing 1 is buoyant forces from the gas acting on the equipment such as the filling vessel 2, the scale 3, the pedestal 8 and the filling gas feeding pipe 7 accommodated in the measurement housing 1, and the buoyant force F from the gas acting on the solid capacity Q, which is sum of capacities of the equipment accommodated in the measurement housing 1 is calculated from the following formula.

Buoyant forces $F$=solid capacity $Q$×density ρ

The variation of weight of the measurement housing 1 when the temperature in the measurement housing 1 varies from ta° C. to tb° C. is based on the variation of the buoyant forces because it is considered that the solid capacity Q does not change. Here, the variation amount of weight ΔW can be calculated based on the measurement results in the steps S21 and S23 from the following formula.

variation amount of weight $\Delta W = Wtb - Wta$

On the other hand, the variation amount ΔF of buoyant forces is based on the variation amount of gas density ρ{ρ(tb)−ρ(ta)}, and is calculated from the following formula.

variation amount of buoyant forces $\Delta F$=solid capacity $Q$×variation amount of gas density $\rho\{\rho(tb)-\rho(ta)\}$ The variation amount of weight ΔW equals the variation amount of buoyant forces ΔF (ΔW=ΔF), so that the solid capacity Q can be calculated from the following formula.

$$\Delta W = \Delta F$$

$$\therefore Wtb - Wta = Q\{\rho(tb) - \rho(ta)\}$$

$$\therefore Q = \{Wtb - Wta\}/\{\rho(tb) - \rho(ta)\}$$

When the solid capacity Q is determined by the formula described above, the control shown in FIG. 5 is finished.

In the embodiment shown in the drawings, as described in FIGS. 4 and 5, an error caused by changing buoyant force from the gas such as dried air and nitrogen in the measurement housing 1 before and after filling the hydrogen gas is eliminated.

Therefore, effects by variations of weight of the filled hydrogen, which arise from variations of buoyant force from gas, are eliminated, which precisely measures hydrogen gas filling amount, resulting in improved accuracy of the calibration of the hydrogen gas filling apparatus 40.

In the embodiment shown in the drawings, when eliminating variations of buoyant forces from the gas in the measurement housing 1, a buoyant force acting on sum (solid capacity Q) of capacities of equipment such as the filling vessel 2, the scale 3, a pedestal 8 and a filling gas feeding pipe 7 accommodated in the measurement housing 1 only is considered, and a buoyant force from the gas acting on a capacity AQ, which is the capacity of the measurement housing 1 minus the solid capacity Q, is not considered. That is, the calculation considering the effect of the buoyant force is performed to the solid capacity Q only. The variations of the buoyant forces from the gas in the measurement housing 1 that are determined in the manner described above considerably match the inventor's experiment results.

Then, in the embodiment shown in the drawings, when the buoyant force from the gas such as dried air and nitrogen in the measurement housing 1 is calculated, calculating gas temperature on the surface of the filling vessel 2 is measured to determine the gas density ρ from the gas temperature on the surface of the filling vessel 2 as a representative value, so that regardless of variations of the gas temperature by the measuring time and position, it is possible to determine the buoyant force from the gas in the measurement housing 1 to eliminate an error due to the buoyant force variations.

According to the inventor's investigations and experiments, it is confirmed that a result obtained by determining the gas temperature on the surface of the filling vessel 2 as the representative value accurately corresponds to the gas density ρ calculated by complex calculations considering heat transmission, radiation and time course. That is, with the embodiment shown in the drawings, the buoyant force from the gas such as dried air and nitrogen in the measurement housing 1 can be calculated without performing the complex calculations considering the heat transmission, the radiation and the time course.

In the embodiment shown in the drawings, the dry gas is filled in the measurement housing 1 through the dry gas pipe 4, and a gas with moisture such as air is discharged outside of the measurement housing 1. As a result, even when a fuel gas such as hydrogen gas, which has been cooled at −40° C., is fed to the filling vessel 2 of the calibration device 100, it is prevented that dew condenses on the equipment in the measurement housing 1, and the calibration with high accuracy, reliability and safety can be performed.

In addition, in the embodiment, the dry gas pipe 4 is detachably mounted to the measurement housing 1, so that at the weight measurements in the calibration, the dry gas pipe 4 is separated from the measurement housing 1 to prevent that stresses generating in the members configuring the dry gas pipe 4 vary the results of the weight measurements.

In addition, in the embodiment, since the measurement housing 1 is semi-enclosed structure, making the measurement housing 1 slightly pressurized by the dry gas can prevent air with moisture from entering into the measurement housing 1. Therefore, even when the hydrogen, which has been cooled at −40° C., is filled in the filling vessel 2, it is prevented that dew condenses on the filling vessel 2, the receptacle 6, the filling gas supply pipe 7 and other parts.

Further, in the embodiment is mounted the dew-point instrument 5 for measuring the dew-point temperature in the measurement housing 1, so that based on the measured results by the dew-point instrument 5, humidity management can be properly performed in the measurement housing 1.

For example, when the dew-point instrument 5 measures that the dew-point temperature reaches the predetermined temperature, for instance −20° C., which is a dew-point temperature that can be judged it is sufficiently dried in the measurement housing 1, it can be judged it is sufficiently dried in the measurement housing 1, and the hydrogen gas at −40° C. for instance may be filled in the measurement housing 1. Since it is sufficiently dried in the measurement housing 1 in such a case, amount of dews condensing on the filling vessel 2, the receptacle 6, the filling gas supply pipe 7 and other parts are few, and the amount hardly effects on the weight measurement.

Here, it is expected that decreasing the dew point to −40° C. or less for instance causes the amount of the condensing dew to become zero, but the difference between the amount at −40° C. or less and that at −20° C. or less is small. Therefore, it is realistic and economical that the dew-point temperature is set from −20° C. to −25° C. as a reference dew-point temperature that can be judged to be necessarily and sufficiently dried.

The embodiment assumes to continuously perform the calibrations to plural hydrogen filling apparatuses 40.

When the calibration is performed only once, even when by filling the hydrogen gas, which has been cooled at −40° C. for instance in the filling vessel 2, dews condense on the filling vessel 2, the receptacle 6, the filling gas supply pipe 7 and other parts, the weight of the measurement housing 1 is measured to perform accurate calibration after dews are sufficiently dried. But, in case that with a single calibration device 100 are continuously performed the calibrations to plural hydrogen filling apparatus 40, condensing dew on the filling vessel 2 causes the weight measurement to be suspended until the dew is sufficiently dried, so that it requires a long period of time to perform the calibrations.

In contrast, with the embodiment, it is prevented that dews condense on the equipment and pipes in the measurement housing 1, so that it is unnecessary to suspend the weight measurement until the dew-condensed equipment and pipes are dried.

Therefore, in case that plural hydrogen filling apparatus 40 are continuously calibrated by the calibration device 100, it is unnecessary to wait for drying of the dew-condensed equipment and pipes every calibration, and it is possible to continuously fill in order to perform the calibrations and various tests.

In addition, when an abnormal temperature is measured by the temperature sensor T, or when an abnormal pressure is detected by a pressure gauge not shown mounted on the filling gas feeding pipe 7, an emergency stopping signal is transmitted to the hydrogen filling apparatus 40 through the control unit CU to stop the filling motion, which realizes a safe and reliable system configuration.

The embodiment shown in drawings are just examples, and a technical field of the present invention is not limited to the embodiment. For example, in the embodiment shown in the drawings, a calibration device for a hydrogen filling apparatus is explained, but, the present invention is applicable to a calibration device for a CNG filling apparatus.

DESCRIPTION OF THE REFERENCE NUMERALS 1 measurement housing
2 filling vessel
3 scale
4 dry gas pipe
5 dew-point instrument
6 receptacle (hydrogen receiving port)
7 filling gas feeding pipe
8 pedestal
9 check valve
11 filling gas outlet
12 filling gas discharging pipe
13 gas outlet
14, 15 supporting members
20 main body housing
20A moving means (wheels etc.)
40 hydrogen filling apparatus
41 filling nozzle
42 hydrogen pipe
100 calibration device
B1 block for calculating filling amount before amendment
B2 block for determining air density
B3 block for determining solid capacity
B4 block for determining amount of buoyant force change
B5 block for determining amended value of filling amount
B6 memory block
CU control unit
DD display
TD temperature sensor

What is claimed is:

1. A calibration device comprising:
    a measurement housing;
    a plurality of wheels operatively coupled to the measurement housing to facilitate movement of the calibration device;
    a filling vessel, accommodated in the measurement housing, to said filling vessel a high pressure fuel gas being fed from outside of the measurement housing;
    a temperature sensor mounted on the filling vessel and operative to measure a temperature of a surface of the filling vessel;
    a scale for measuring a weight collectively defined by the measurement housing and the filling vessel; and
    a control device for eliminating an error in the weight caused by changing buoyant force from a gas in the measurement housing before and after filling the fuel gas, the control device being in communication with the temperature sensor and operative to calculate a buoyant force of the gas in the measurement housing based on the measured temperature.

2. The calibration device as claimed in claim 1, wherein said control device calculates the buoyant force acting on a sum of capacities of equipment accommodated in the measurement housing to eliminate the error.

3. A calibration method for a fuel gas filling apparatus with the calibration device as claimed in claim 1, comprising the steps of:
    measuring weights of the measurement housing before and after filling the fuel gas; and
    eliminating the error.

4. The calibration method as claimed in claim 3, wherein the step for eliminating the error comprises calculating the buoyant force acting on a sum of capacities of equipment accommodated in the measurement housing.

5. The calibration device as claimed in claim 1, further comprising a dry gas pipe detachably mountable to the measurement housing for feeding dry gas to the measurement housing.

6. The calibration device as claimed in claim 1, further comprising:
    a receptacle mounted on the measurement housing, the receptacle being sized and structured to receive the high pressure fuel gas; and
    a filling gas supply pipe extending between the receptacle and the filling vessel to communicate the high pressure fuel gas from the receptacle to the filling vessel.

7. The calibration device as claimed in claim 6, further comprising a supporting member coupled to the filling gas supply pipe and the measurement housing, the supporting member being sized and structured to fix the filling gas supply line to the measurement housing.

8. The calibration device as claimed in claim 1, further comprising a gas outlet mounted on the measurement housing, the gas outlet being sized and structured to discharge gas from the measurement housing.

9. The calibration device as claimed in claim 1, further comprising:
    a filling gas discharge port mounted on the measurement housing; and
    a filling gas release pipe extending between the filling vessel and the filling gas discharge port, the filling gas release pipe being sized and structured to communicate the high pressure fuel gas from the filling vessel to the filling gas discharge port.

10. The calibration device as claimed in claim 9, further comprising a supporting member connected to the filling gas release pipe and the measurement housing, the supporting member being sized and structured to fix the filling gas release pipe to the measurement housing.

11. The calibration device as claimed in claim 1, further comprising a dew-point instrument for measuring a dew-point temperature in the measurement housing.

12. The calibration device as claimed in claim 1, further comprising a main body housing, the plurality of wheels being coupled to the main body housing, and the measurement housing being located within the main body housing.

13. The calibration device as claimed in claim 1, wherein the scale is positioned outside of the measurement housing.

* * * * *